United States Patent
Skog

(10) Patent No.: US 6,275,692 B1
(45) Date of Patent: *Aug. 14, 2001

(54) SERVER REQUEST INCLUDING CODE FOR CUSTOMIZING SERVICE TO REQUESTING CELLULAR MOBILE STATION

(75) Inventor: Robert Skog, Sollentuna (SE)

(73) Assignee: Telefonaktiebolaget L M Ericsson (publ), Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/022,217

(22) Filed: Feb. 11, 1998

(51) Int. Cl.$^7$ ............................................. H04M 3/42
(52) U.S. Cl. .................. 455/414; 455/432; 455/435; 455/445
(58) Field of Search ................... 455/422, 410, 455/411, 432, 445, 406, 419, 414

(56) References Cited

U.S. PATENT DOCUMENTS

| | | | |
|---|---|---|---|
| 5,428,665 | * 6/1995 | Lantto | 379/58 |
| 5,502,831 | 3/1996 | Grube et al. | 395/427 |
| 5,507,009 | * 4/1996 | Grube et al. | 455/54.1 |
| 5,572,582 | 11/1996 | Riddle | 379/202 |
| 5,610,973 | 3/1997 | Comer | 379/59 |
| 5,752,188 | * 5/1998 | Astrom et al. | 455/433 |
| 5,850,445 | * 12/1998 | Chan et al. | 380/23 |
| 5,896,566 | * 4/1999 | Averbuch et al. | 455/419 |
| 5,924,035 | * 7/1999 | Joensuu | 455/445 |
| 5,928,325 | * 7/1999 | Shaughnessy et al. | 395/200.36 |
| 5,946,633 | * 8/1999 | McAlinden | 455/551 |
| 6,055,424 | * 4/2000 | Tornqvist et al. | 455/414 |

FOREIGN PATENT DOCUMENTS

| | | | |
|---|---|---|---|
| 0685972 | 12/1995 | (EP) | H04Q/7/20 |
| 9620572 | 4/1996 | (WO) | H04Q/7/24 |
| 9701942 | 1/1997 | (WO) | H04Q/7/38 |

OTHER PUBLICATIONS

European Telecommunications Standard Institute; European Telecommunication Standard Draft pr ETS 300 625, Second Version, 4/97, GSM: Global System for Mobile Communications, *Digital Cellular Telecommunications System (Phase 2)*; Unstructured Supplementary Service Data (USSD)13 Stage 1 (GSM 02.90).

European Telecommunications Standard Institute, GSM Technical Specification, Version 5.0.0, 12/96, GSM: Global System for Mobile Communications, *Digital Cellular Telecommunications System*; Unstructured Supplementary Service Data (USSD) —Stage 2 (GSM 03.90).

* cited by examiner

*Primary Examiner*—William Trost
*Assistant Examiner*—Tilahun Gesesse
(74) *Attorney, Agent, or Firm*—Jenkens & Gilchrist, P.C.

(57) ABSTRACT

A mobile station operating in a cellular communication network requests service from a server coupled to the cellular communication network. Within the mobile station is composed a request for service including a code for use by the server in determining operational capabilities of the mobile station. The request for service is then sent from the mobile station to the server. The server uses the code to determine operational capabilities of the mobile station, and then provides a level of service to the mobile station commensurate with the operational capabilities of the mobile station.

16 Claims, 4 Drawing Sheets

SERVER REQUEST INCLUDING CODE FOR CUSTOMIZING SERVICE TO REQUESTING CELLULAR MOBILE STATION

BACKGROUND OF THE INVENTION

FIG. 1 diagrammatically illustrates a mobile station (MS) 11 which accesses a server 13 via a cellular communications network 15 including an MSC/VLR 17 and an HLR 19. Various conventional components of the cellular network 15 (such as the base station system) are omitted for clarity of exposition. The cellular network may be a GSM (Global System for Mobility) network. An arrangement of this type is disclosed in WIPO document WO 96/20572, and in U.S. patent application Ser. No. 363,027 filed on Dec. 23, 1994, both of which documents are hereby incorporated herein by reference.

The server 13 is located externally relative to the cellular network 15, but is coupled to HLR for communication with the cellular network. The mobile station 11 sends a request for service to MSC/VLR 17, as indicated at 12 in FIG. 1. The request may be formatted according to the conventional Unstructured Supplementary Service Data (USSD) protocol. The USSD protocol is defined in the ETSI Draft prETS 300 625 (GSM 02.90 version 4.1.0), and in ETSI GSM 03.90 version 5.0.0, both of which documents are hereby incorporated herein by reference.

MSC/VLR 17 forwards the USSD request received from the mobile station 11 to HLR 19, which in turn forwards the request to the server 13. These communications are carried out using conventional MAP-USSD protocol, wherein MAP is the GSM acronym for Mobile Application Part. The server 13 can be any type of service node, and is typically capable of servicing a wide variety of mobile stations having a wide variety of operational characteristics. The server is capable of providing different levels of service commensurate with the different operational capabilities of the mobile stations. However, for a given request, the server has no way to determine what level of service is appropriate. Accordingly, the server 13 typically provides, in response to a USSD request for service, a generic level of service which is appropriate for the least sophisticated mobile station that can be expected to request service. The service is provided by the server in a USSD reply to the USSD request. The reply is passed from the server to HLR, from HLR to MSC/VLR, and from MSC/VLR to the mobile station.

Thus, mobile stations having higher levels of operational capability will typically receive a lower level of service that is commensurate with a mobile station having a lower level of operational capability. The higher level operational capabilities of the more sophisticated mobile stations are typically not utilized by the lower level of service that is provided by the server 13.

It is therefore desirable to enable a server to provide to each requesting mobile station a level of service commensurate with the operational capabilities of that mobile station.

In the present invention, the mobile station provides in its request for service information from which the server can determine the operational capabilities of the mobile station. Once the operational capabilities of the mobile station have been determined by the server, the server can then provide a level of service commensurate with those operational capabilities.

DETAILED DESCRIPTION

Figure 1:
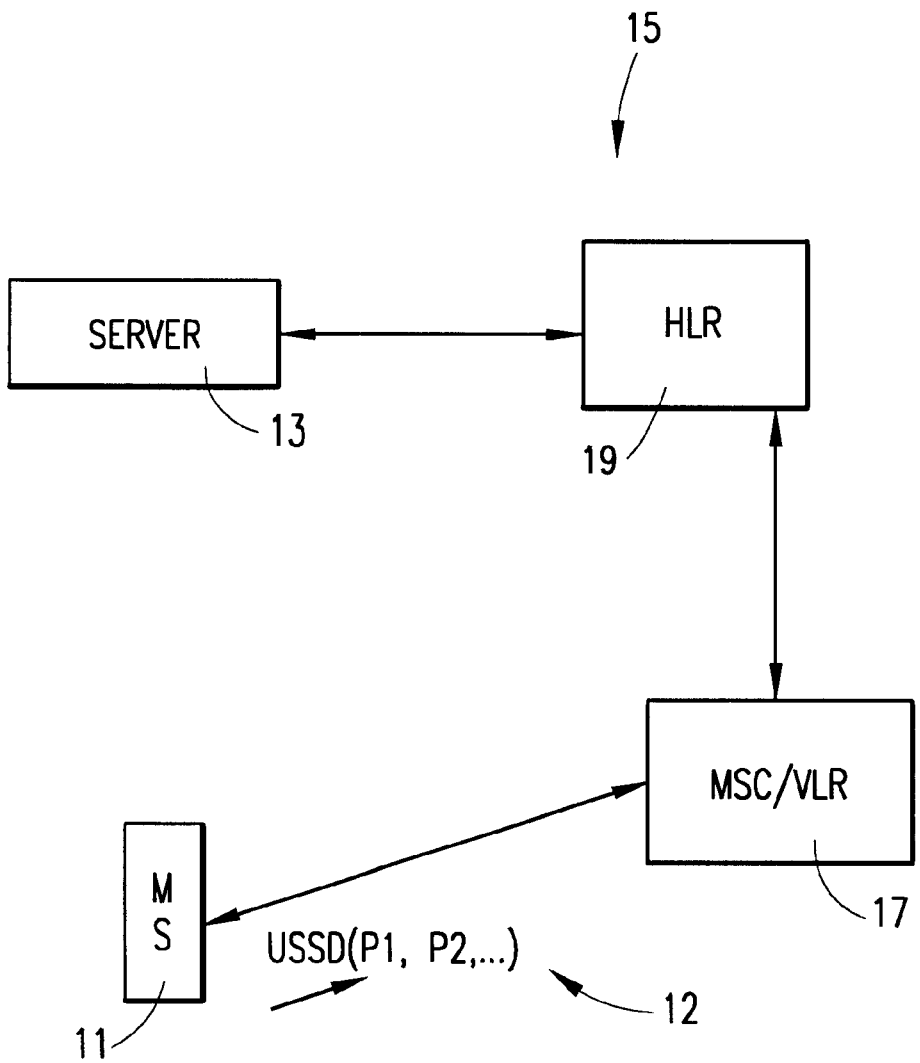
FIG. 1 illustrates a conventional example of a mobile station using a cellular network to request services from a server.
Figure 2:
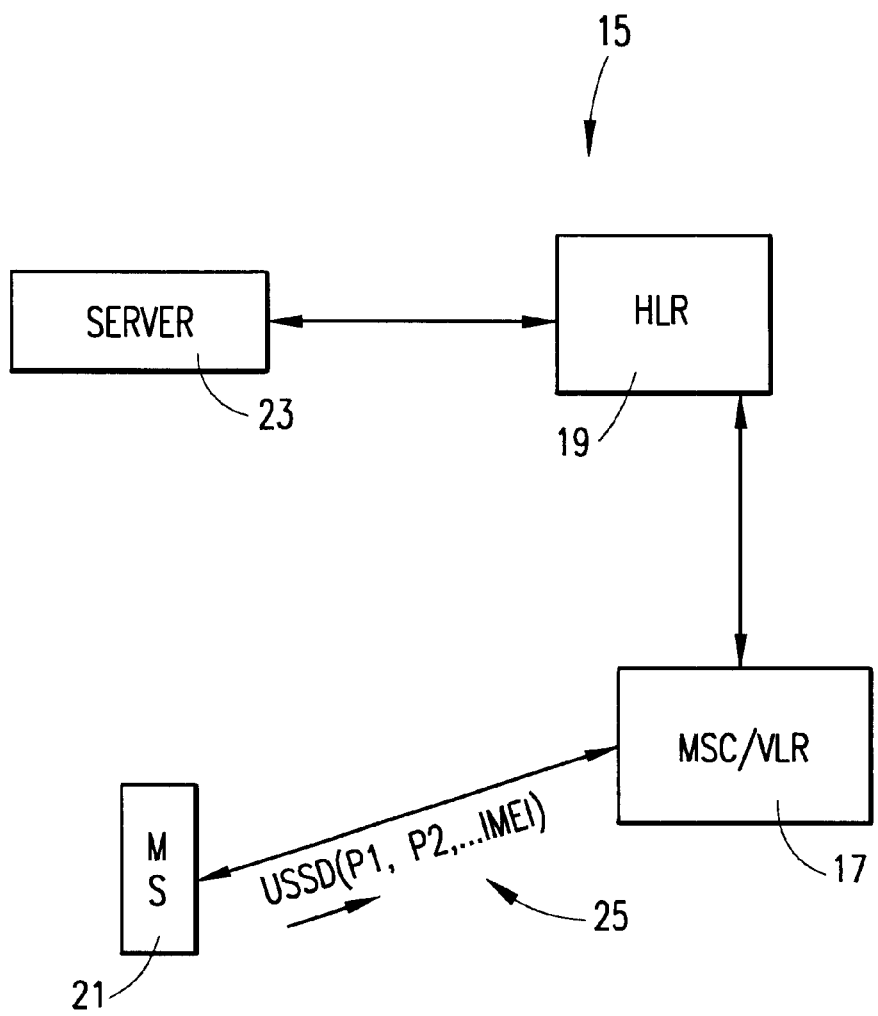
FIG. 2 illustrates an example according to the present invention of a mobile station using a cellular network to request services from a server.

Exemplary FIG. 2 illustrates a mobile station 21 requesting service from a server 23 via a cellular network 15 according to the present invention. The server 23 is located externally relative to the cellular network 15, but is coupled to HLR for communication with the cellular network. The server 23 can be any type of service node capable of servicing mobile stations.

In FIG. 2, the request from mobile station 21 proceeds to MSC/VLR 17 and is forwarded to HLR 19 from which it is forwarded to server 23. As illustrated in FIG. 2, the USSD request at 25 includes the conventional parameters normally included in a USSD request, represented in FIG. 2 at P1, P2, etc. The USSD request also includes the International Mobile Station Equipment Identity (IMEI) code which uniquely identifies the mobile station 21. The IMEI code is conventionally incorporated by the manufacturer into a module which is built into the mobile station and is physically secured therein. The IMEI code uniquely identifies the mobile station as a piece of equipment, and is often used conventionally to identify a mobile station as either a valid or not valid customer during call set-up.

Figure 3:
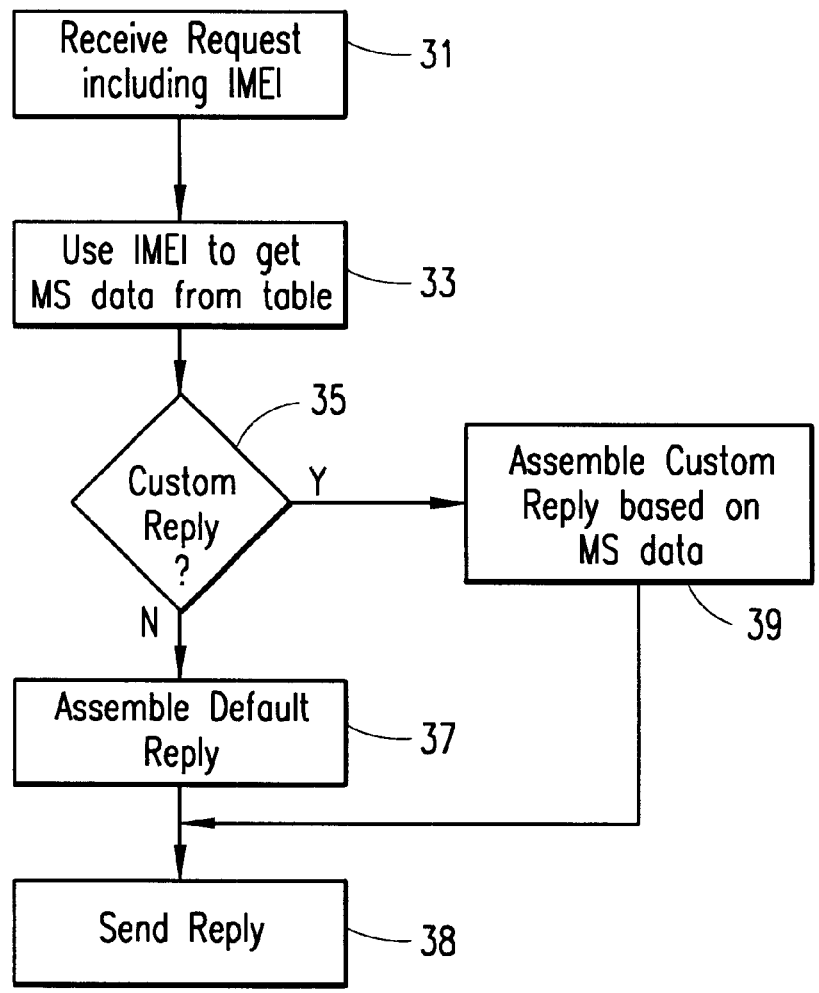
FIG. 3 illustrates the operation of the server of FIG. 2 in response to the request received from the mobile station.

Exemplary FIG. 3 illustrates the operation of server 23 in response to receipt of the USSD request for service illustrated in FIG. 2. At 31, the server receives the USSD request, including the IMEI code. At 33, the server uses the IMEI code to obtain from a table information regarding the operational capabilities of the mobile station 21. It is then determined at 35 whether or not the mobile station 21 has a high enough level of operational capability to warrant a customized reply, or whether the operational capabilities only warrant a generic reply similar to that used in the prior art. Thereafter, either a custom reply is assembled at 39 based on the data that was obtained regarding the operational capabilities of the mobile station, or the server defaults to the generic reply at 37. The appropriate reply is then sent back to the mobile station at 38.

The reply of server 23 is sent from server 23 back to HLR 19, and is then forwarded to MSC/VLR 17, from which it is forwarded to the mobile station 21.

As one example, the server 23 could provide a conventional service such as Unified Messaging Service. This conventional service organizes the mobile station's access to voice mail, fax mail, etc. In this instance, the generic reply or service to which the server 23 defaults might be to merely provide the mobile station with the number of voice mail messages that have been received. On the other hand, a customized reply for a mobile station with higher levels of operational capabilities might include, for each voice mail message received, the time of receipt of the voice mail message, the length of the voice mail message, etc. A mobile station having an even higher level of operational capability, such as one that supports Java, might actually receive the entire voice mail application from the server. In this case, the mobile station can actually run the voice mail application itself rather than merely receive results from the server.

As another example of differing mobile station operational capabilities, one mobile station may have an advanced graphic display, so that the server can provide to the mobile station graphics instead of or in addition to text, while another less sophisticated mobile station might have a less sophisticated graphics display or no graphics display at all, in which case the server would not provide as much or as detailed graphical information as it would if the mobile station had a more sophisticated graphics display.

Figure 4:
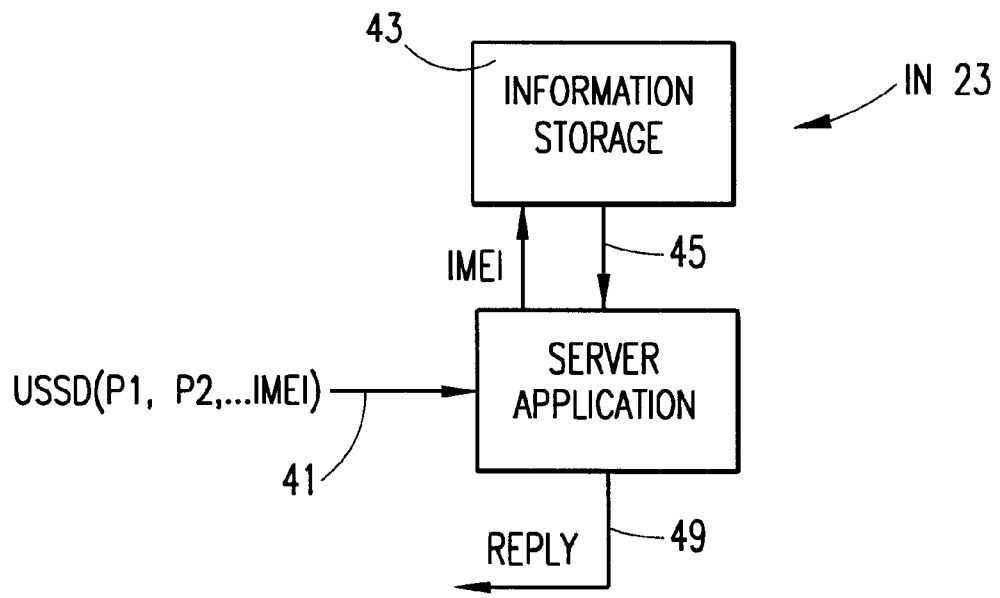
FIG. 4 illustrates a portion of the server of FIG. 2 in more detail.

Example FIG. 4 illustrates a portion of the server 23 of FIG. 2 in more detail. As shown in FIG. 4, the USSD request including the IMEI code is received at an input 41 of server 23. The USSD request is received by the server application. The IMEI code is applied to an information storage apparatus 43 in order to obtain from a lookup table or other database therein the operational capabilities of the mobile station corresponding to the IMEI code. The information regarding operational capabilities is provided to the server application at 45. The server application then determines from the operational capabilities whether or not a customized reply is necessary. Either the customized reply or the default reply is then output at 49.

Figure 5:
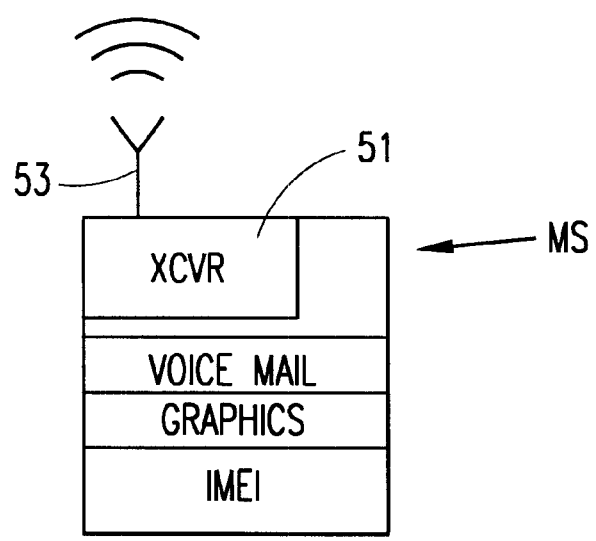
FIG. 5 illustrates the mobile station of FIG. 2 in more detail.

Example FIG. 5 illustrates the mobile station 21 of FIG. 2 in greater detail. In particular, the mobile station 21 includes a radio transceiver (XCVR) 51 coupled to an input/output antenna 53, and a voice mail section and/or a graphic section for providing the voice mail and/or graphics capabilities described above. The mobile station 21 also includes the IMEI code fixedly secured therein as described above. The USSD request of FIG. 2 is output from the transceiver 51 and antenna 53, and the reply from the server 23 is received by the antenna 53 and transceiver 51.

Although exemplary embodiments of the present invention have been described above in detail, this does not limit the scope of the invention, which can be practiced in a variety of embodiments.

What is claimed is:

1. A server connectable to a cellular communication network for providing a service via the cellular communication network to a mobile station operating in the cellular communication network, comprising:

an input for receiving from the mobile station via the cellular communication network a request for service, said request for service having the ability to include a code for determining operational capabilities of the mobile station, said operational capabilities indicative of a level of the requested service supported by the mobile station and for receiving a request for service which may not include the code for determining operational capabilities; and an output for providing a reply responsive to the request, wherein said reply is provided in at least one format depending upon the operational capabilities of the mobile station if said code has been provided and in a default format if said code has not been provided or is not decodeable so as to determine the operational capabilities of the mobile station and in which the operable characteristics of said mobile station does not need to change in response to said message.

2. The server of claim 1, including an information storage apparatus having stored therein information indicative of the operational characteristics of the mobile station, said memory having an input to receive said code and having an output responsive to said code to provide the information.

3. The server of claim 2, wherein said reply is customized to the operational capabilities of the mobile station in response to the information.

4. The server of claim 1, wherein said reply is customized to the operational capabilities of the mobile station.

5. The server of claim 1, wherein the request is made according to Unstructured Supplementary Service Data (USSD) protocol.

6. The server of claim 1, wherein the request includes a request for unified messaging service.

7. A server system connectable to a cellular communication network for providing a service via the cellular communication network to a mobile station operating in the cellular communication network, comprising:

an information storage apparatus having stored therein information indicative of operational capabilities of the mobile station; and a server coupled to said information storage apparatus, said server having an input for receiving from the mobile station via the cellular network a request for service including a code for use in accessing the information stored in said information storage apparatus, said information storage apparatus located externally relative to said server, said operational capabilities indicative of a level of the requested service supported by the mobile station such that the operable characteristics of said mobile station does not need to change in response to a message and means to provide an indication that a default level of capabilities should be used with said mobile station.

8. The server system of claim 7, wherein said server includes an output that is responsive to the request and the information to provide a reply that is customized to the operational capabilities of the mobile station.

9. The server system of claim 7, wherein the request is made according to Unstructured Supplementary Service Data (USSD) protocol.

10. The server system of claim 7, wherein the request includes a request for unified messaging service.

11. A method of processing a request for service sent by a mobile station through a cellular communication network to a server, comprising:

receiving the request at the server, wherein said request can include receiving an operational capabilities code at the server; and using the operational capabilities code if part of said request to determine operational capabilities of the mobile station such that the operable characteristics of said mobile station does not need to change in response to receipt of a return message, said operational capabilities indicative of a level of the requested service supported by the mobile station and to determine a default capabilities set for the mobile station if said code is not present and to determine the same default capabilities set if said code is present but not decodeable.

12. The method of claim 11, wherein said using step includes using the operational capabilities code to access stored information that is indicative of the operational capabilities of the mobile station.

13. The method of claim 11, including sending from the server to the mobile station a reply that is customized to the operational capabilities of the mobile station.

14. The method of claim 13, wherein said sending step and said receiving step each include using Unstructured Supplementary Service Data (USSD) protocol.

15. The method of claim 11, wherein the request includes a request for unified messaging service.

16. The method of claim 11, wherein the operational capabilities code is an International Mobile station Equipment Identity (IMEI) code uniquely associated with the mobile station.

* * * * *

UNITED STATES PATENT AND TRADEMARK OFFICE
CERTIFICATE OF CORRECTION

PATENT NO. : 6,275,692 B1
DATED : August 14, 2001
INVENTOR(S) : Robert Skog

It is certified that error appears in the above-identified patent and that said Letters Patent is hereby corrected as shown below:

Column 1,
Line 4, before "Background of the Invention" insert
-- FIELD OF THE INVENTION
This invention relates to cellular communications and, more particularly, the use of a mobile station to access a server via a cellular communication network. --

Column 3,
Line 23, replace "graphic" with -- graphics --

Signed and Sealed this

Twenty-eighth Day of January, 2003

JAMES E. ROGAN
*Director of the United States Patent and Trademark Office*